United States Patent
Menheere

(10) Patent No.: US 12,486,803 B2
(45) Date of Patent: Dec. 2, 2025

(54) GAS TURBINE ENGINE SYSTEM WITH FUEL DRIVEN TURBINE

(71) Applicant: Pratt & Whitney Canada Corp., Longueuil (CA)

(72) Inventor: David Menheere, Norval (CA)

(73) Assignee: Pratt & Whitney Canada Corp., Longueuil (CA)

( * ) Notice: Subject to any disclaimer, the term of this patent is extended or adjusted under 35 U.S.C. 154(b) by 102 days.

(21) Appl. No.: 18/211,071

(22) Filed: Jun. 16, 2023

(65) Prior Publication Data

US 2024/0418128 A1    Dec. 19, 2024

(51) Int. Cl.
F02C 7/22    (2006.01)
F02C 7/12    (2006.01)

(52) U.S. Cl.
CPC . F02C 7/22 (2013.01); F02C 7/12 (2013.01)

(58) Field of Classification Search
CPC .. F02C 7/224; F02C 7/22; F02C 7/143; F02C 7/141; F02C 9/40; F05D 2260/211
See application file for complete search history.

(56) References Cited

U.S. PATENT DOCUMENTS

| | | |
|---|---|---|
| 9,765,691 B2 | 9/2017 | Delgado |
| 9,932,124 B2 | 4/2018 | Kamath |
| 11,041,439 B2 | 6/2021 | Roberge |
| 11,047,307 B2 | 6/2021 | Roberge |
| 11,542,869 B2 | 1/2023 | Smith |
| 2012/0096869 A1 | 4/2012 | Kesseli |
| 2016/0123226 A1 | 5/2016 | Razak |
| 2017/0370284 A1* | 12/2017 | Harvey .......... F01D 9/023 |
| 2020/0088102 A1 | 3/2020 | Roberge |
| 2021/0332759 A1 | 10/2021 | Smith |
| 2021/0340908 A1* | 11/2021 | Boucher ......... F02C 7/224 |
| 2022/0178307 A1 | 6/2022 | Palmer |
| 2022/0195928 A1 | 6/2022 | Johnson |
| 2022/0333776 A1* | 10/2022 | Rybak-Tucholska ... F23R 3/346 |
| 2023/0280032 A1* | 9/2023 | Clark ............. F02C 7/224 60/730 |
| 2024/0010352 A1* | 1/2024 | Holley ............. F02C 3/22 |

OTHER PUBLICATIONS

EP Search Report for EP Patent Application No. 24181762.6 dated Feb. 12, 2025.

* cited by examiner

Primary Examiner — Devon C Kramer
Assistant Examiner — Rodolphe Andre Chabreyrie
(74) Attorney, Agent, or Firm — Getz Balich LLC

(57) ABSTRACT

An engine system is provided that includes an engine core assembly and a fuel system. The engine core assembly includes a core flowpath, a core compressor section, a core combustor section and a core turbine section. The core flowpath extends through the core compressor section, the core combustor section and the core turbine section from an inlet into the core flowpath to an exhaust from the core flowpath. The core compressor section includes a core compressor rotor. The combustor section includes a combustor. The fuel system includes a fuel flowpath, a fuel turbine section and a fuel injector. The fuel flowpath extends through the fuel turbine section to the fuel injector. The fuel turbine section includes a fuel turbine rotor coupled to and rotatable with the core compressor rotor. The fuel injector is configured to direct fuel received from the fuel flowpath into the combustor.

14 Claims, 2 Drawing Sheets

GAS TURBINE ENGINE SYSTEM WITH FUEL DRIVEN TURBINE

TECHNICAL FIELD

This disclosure relates generally to an aircraft and, more particularly, to a turbine engine system for the aircraft.

BACKGROUND INFORMATION

There is interest in alternative fuels for gas turbine engines. There is interest, for example, in fueling a gas turbine engine with hydrogen rather than a traditional hydrocarbon fuel such as kerosine to reduce greenhouse emissions. Various systems and methods are known in the art for fueling a gas turbine engine with hydrogen. While these known systems and methods have various advantages, there is still room in the art for improvement.

SUMMARY

According to an aspect of the present disclosure, an engine system is provided that includes an engine core assembly and a fuel system. The engine core assembly includes a core flowpath, a core compressor section, a core combustor section and a core turbine section. The core flowpath extends through the core compressor section, the core combustor section and the core turbine section from an inlet into the core flowpath to an exhaust from the core flowpath. The core compressor section includes a core compressor rotor. The combustor section includes a combustor. The fuel system includes a fuel flowpath, a fuel turbine section and a fuel injector. The fuel flowpath extends through the fuel turbine section to the fuel injector. The fuel turbine section includes a fuel turbine rotor coupled to and rotatable with the core compressor rotor. The fuel injector is configured to direct fuel received from the fuel flowpath into the combustor.

According to another aspect of the present disclosure, another engine system is provided that includes an engine core assembly and a fuel system. The engine core assembly includes a core flowpath, a core compressor section, a core combustor section and a core turbine section. The core flowpath extends through the core compressor section, the core combustor section and the core turbine section from an inlet into the core flowpath to an exhaust from the core flowpath. The core compressor section includes a core compressor rotor. The combustor section includes a combustor. The core turbine section includes a core turbine rotor. The fuel system includes a fuel flowpath, a fuel turbine section and a fuel injector. The fuel flowpath extends through the fuel turbine section to the fuel injector. The fuel turbine section includes a fuel turbine rotor. The fuel injector is configured to direct fuel received from the fuel flowpath into the combustor. The fuel turbine rotor, the core compressor rotor and the core turbine rotor are rotatable about a common rotational axis.

According to still another aspect of the present disclosure, another engine system is provided that includes an engine core assembly and a fuel system. The engine core assembly includes a core flowpath, a core compressor section, a core combustor section and a core turbine section. The core flowpath extends through the core compressor section, the core combustor section and the core turbine section from an inlet into the core flowpath to an exhaust from the core flowpath. The core compressor section includes a core compressor rotor. The combustor section includes a combustor. The core turbine section includes a core turbine rotor. The fuel system includes a fuel flowpath, a fuel turbine section and a fuel injector. The fuel flowpath extends through the fuel turbine section to the fuel injector. The fuel turbine section includes a fuel turbine rotor. The fuel turbine rotor is arranged radially inboard of the combustor and axially between the core compressor rotor and the core turbine rotor. The fuel injector is configured to direct fuel received from the fuel flowpath into the combustor.

The fuel turbine rotor may be configured to drive rotation of the core compressor rotor.

The core turbine rotor may be configured to drive rotation of the core compressor rotor.

The fuel system may be configured to expand the fuel flowing within the fuel flowpath along the fuel turbine section to drive rotation of the fuel turbine rotor. The fuel turbine rotor may be configured to drive rotation of the core compressor rotor to compress gas flowing within the core flowpath along the core compressor section.

The fuel may be hydrogen. The fuel system may also include a fuel reservoir configured to contain a quantity of the hydrogen in a liquid phase. The fuel system may be configured to direct the hydrogen into the combustor in a gaseous phase through the fuel injector.

The core compressor rotor and the fuel turbine rotor may be rotatable about an axis.

The combustor may be disposed axially between an outlet from the core compressor section and an inlet into the fuel turbine section along the axis.

The core compressor rotor may be configured as or otherwise include a radial flow compressor rotor.

The core compressor rotor may be configured as or otherwise include an axial flow compressor rotor.

The fuel turbine rotor may be configured as or otherwise include a radial flow turbine rotor.

The fuel turbine rotor may be configured as or otherwise include an axial flow turbine rotor.

The core compressor rotor may be a first core compressor rotor. The core compressor section may also include a second core compressor rotor. The core turbine section may include a core turbine rotor coupled to and rotatable with the second core compressor rotor.

The second core compressor rotor and the core turbine rotor may be rotatable about an axis. At least one of the first core compressor rotor or the fuel turbine rotor may be disposed axially between the second core compressor rotor and the core turbine rotor along the axis.

The core compressor section may include a low pressure compressor section and a high pressure compressor section. The low pressure compressor section may include the second core compressor rotor. The high pressure compressor section may include the first core compressor rotor.

The second core compressor rotor may be configured as or otherwise include a radial flow compressor rotor.

The core compressor section may also include an axial flow compressor rotor. The core turbine rotor may be coupled to and rotatable with the axial flow compressor rotor.

The core turbine rotor may be configured as or otherwise include an axial flow turbine rotor.

The core turbine rotor may be configured as or otherwise include a radial flow turbine rotor.

The engine system may also include an intercooler configured to exchange heat energy between the fuel flowing within the fuel flowpath and gas flowing within the core flowpath. The intercooler may be disposed along the core flowpath between the first core compressor rotor and the second core compressor rotor. The intercooler may be disposed along the fuel flowpath upstream of the fuel turbine rotor.

The engine system may also include a propulsor rotor. The core turbine section may include a core turbine rotor coupled to and rotatable with the propulsor rotor.

The engine system may also include an electric power generator which includes a generator rotor. The core turbine section may include a core turbine rotor coupled to and rotatable with the generator rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
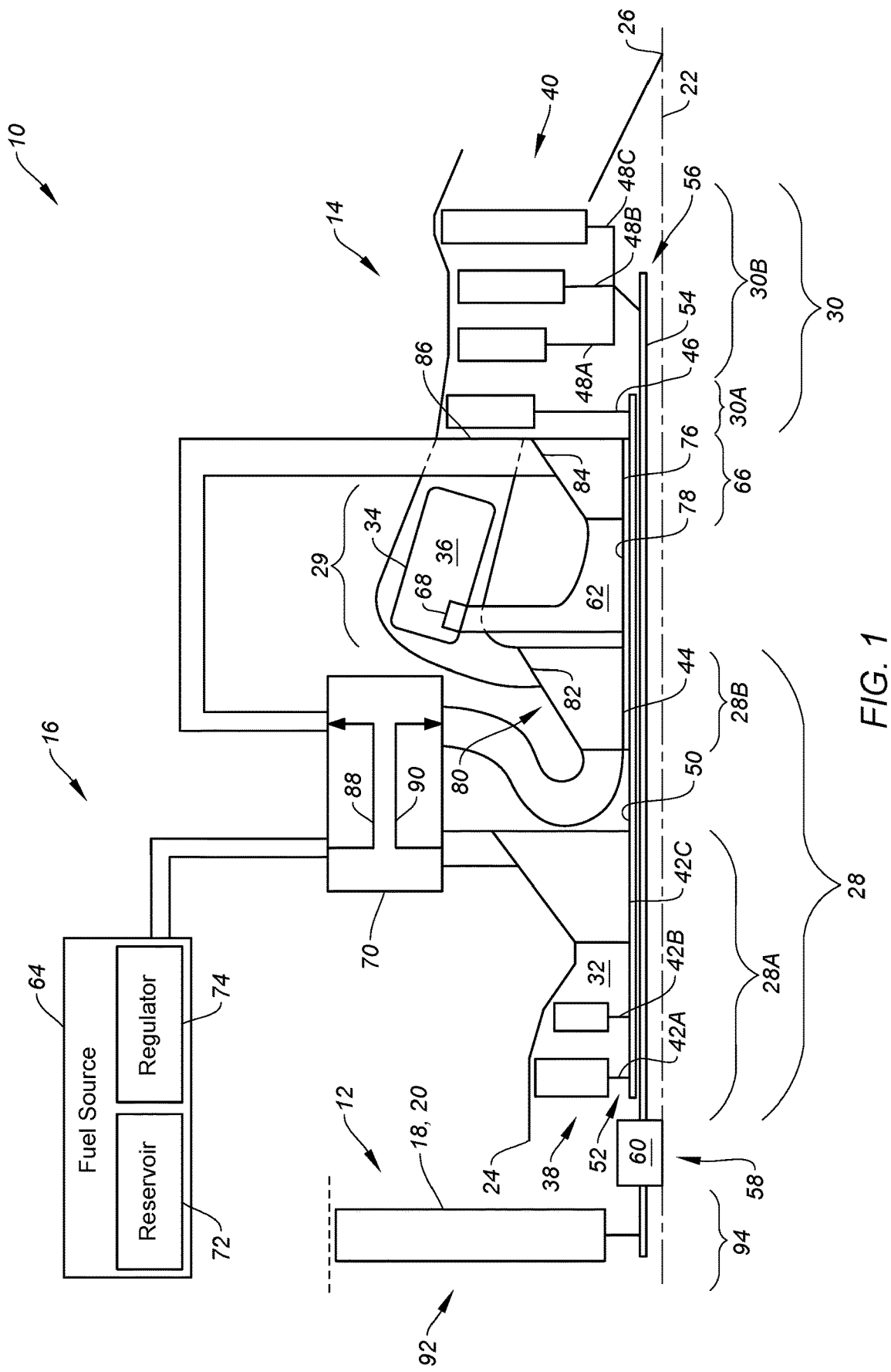
FIG. 1 is a partial schematic illustration of a gas turbine engine system for an aircraft.

FIG. 1 illustrates a gas turbine engine system 10 for an aircraft. The aircraft may be an airplane, a helicopter, a drone (e.g., an unmanned aerial vehicle (UAV)) or any other manned or unmanned aerial vehicle or system. The engine system 10 may be configured as, or otherwise included as part of, a propulsion system for the aircraft. The engine system 10 may also or alternatively be configured as, or otherwise included as part of, an electric power system for the aircraft. However, for ease of description, the engine system 10 may be generally described below as being (or part of) the aircraft propulsion system. The engine system 10 of FIG. 1 includes a mechanical load 12, an engine core assembly 14 and a fuel system 16.

The mechanical load 12 may be configured as or otherwise include a rotor 18 mechanically driven by the engine core assembly 14. This driven rotor 18 may be a bladed propulsor rotor 20 (e.g., an air mover) where the engine system 10 is (or is part of) the aircraft propulsion system. The propulsor rotor 20 includes a plurality of rotor blades arranged circumferentially around and connected to at least (or only) one rotor disk or hub. The propulsor rotor 20 may be an open (e.g., un-ducted) propulsor rotor or a ducted propulsor rotor. Examples of the open propulsor rotor include, but are not limited to, a propeller rotor for a turboprop propulsion system, a rotorcraft rotor (e.g., a main helicopter rotor) for a turboshaft propulsion system, a propfan rotor for a propfan propulsion system, and a pusher fan rotor for a pusher fan propulsion system. Examples of the ducted propulsor rotor include, but are not limited to, a fan rotor for a turbofan propulsion system and a (e.g., first stage) compressor rotor for a turbojet propulsion system. Alternatively, the driven rotor 18 may be a generator rotor in an electric power generator (or more generally an electric machine) where the engine system 10 is (or is part of) the electric power system; e.g., an auxiliary power unit (APU) for the aircraft. However, for ease of description, the driven rotor 18 may be generally described below as the propulsor rotor 20.

The engine core assembly 14 extends axially along an axis 22 between an upstream, forward end 24 of the engine core assembly 14 and a downstream, aft end 26 of the engine core assembly 14. The engine core assembly 14 includes a core compressor section 28, a core combustor section 29, a core turbine section 30 and a core flowpath 32. The core compressor section 28 of FIG. 1 includes a low pressure compressor (LPC) section 28A and a high pressure compressor (HPC) section 28B. The core combustor section 29 includes a combustor 34 (e.g., annular combustor) with an internal combustion chamber 36 (e.g., annular combustion chamber) within the combustor 34. The core turbine section 30 of FIG. 1 includes a high pressure turbine (HPT) section 30A and a low pressure turbine (LPT) section 30B; e.g., a power turbine (PT) section. The core flowpath 32 extends sequentially through the LPC section 28A, the HPC section 28B, the core combustor section 29 and its combustion chamber 36, the HPT section 30A and the LPT section 30B from an airflow inlet 38 into the core flowpath 32 to a combustion products exhaust 40 from the core flowpath 32. The core inlet 38 may be disposed at (e.g., on, adjacent or proximate) the assembly forward end 24, and the core exhaust 40 may be disposed at the assembly aft end 26.

The LPC section 28A includes one or more bladed low pressure compressor (LPC) rotors 42A-C (generally referred to as "42"). The first and the second stage LPC rotors 42A and 42B of FIG. 1 are each configured as an axial flow compressor rotor; e.g., an axial inflow-axial outflow compressor rotor. The third stage LPC rotor 42C of FIG. 1 is configured as a radial flow compressor rotor; e.g., an axial inflow-radial outflow compressor rotor. Each of these LPC rotors 42 includes a plurality of compressor blades (e.g., compressor airfoils, compressor vanes, etc.) arranged circumferentially around and connected to at least (or only) one rotor disk or hub. The LPC rotors 42 are disposed in and arranged longitudinally along the core flowpath 32 between the core inlet 38 and the HPC section 28B. The compressor blades, for example, are disposed in and extend across the core flowpath 32. Each rotor disk or hub is disposed adjacent (e.g., radially below) the core flowpath 32. The present disclosure, however, is not limited to the foregoing exemplary LPC section arrangement. For example, while the LPC section 28A is shown in FIG. 1 with three stages, the LPC section 28A may alternatively include a single one of the stages, two of the stages or more than three stages. Moreover, while the LPC rotors 42 are respectively shown as axial and radial flow compressor rotors, any one or more of the LPC rotors 42 may alternatively be configured as an axial flow compressor rotor or a radial flow compressor rotor.

The HPC section 28B includes a blade high pressure compressor (HPC) rotor 44. The HPC rotor 44 of FIG. 1 is configured as a radial flow compressor rotor; e.g., an axial inflow-radial outflow compressor rotor. The HPC rotor 44 includes a plurality of compressor blades (e.g., compressor airfoils, compressor vanes, etc.) arranged circumferentially around and connected to at least (or only) one rotor disk or hub. The HPC rotor 44 is disposed in and arranged longitudinally along the core flowpath 32 between the LPC section 28A and the combustor 34. The compressor blades, for example, are disposed in and extend across the core flowpath 32. The rotor disk or hub is disposed adjacent (e.g., radially below) the core flowpath 32. The present disclosure, however, is not limited to the foregoing exemplary HPC section arrangement. For example, while the HPC section 28B is shown in FIG. 1 with a single stage, the HPC section 28B may alternatively include multiple stages. Moreover, while the HPC rotor 44 is shown as a radial flow compressor rotor, the HPC rotor 44 may alternatively be configured as an axial flow compressor rotor.

The HPT section 30A includes a blade high pressure turbine (HPT) rotor 46. The HPT rotor 46 of FIG. 1 is configured as an axial flow turbine rotor; e.g., an axial inflow-axial outflow turbine rotor. The HPT rotor 46 includes a plurality of turbine blades (e.g., turbine airfoils, turbine vanes, etc.) arranged circumferentially around and connected to at least (or only) one rotor disk or hub. The HPT rotor 46 is disposed in and arranged longitudinally along the core flowpath 32 between the combustor 34 and the LPT section 30B. The turbine blades, for example, are disposed in and extend across the core flowpath 32. The rotor disk or hub is disposed adjacent (e.g., radially below) the core flowpath 32. The present disclosure, however, is not limited to the foregoing exemplary HPT section arrangement. For example, while the HPT section 30A is shown in FIG. 1 with a single stage, the HPT section 30A may alternatively include multiple stages. Moreover, while the HPT rotor 46 is shown as an axial flow turbine rotor, the HPT rotor 46 may alternatively be configured as a radial flow turbine rotor.

The LPT section 30B includes one or more bladed low pressure turbine (LPT) rotors 48A-C (generally referred to as "48"). The first, the second and the third stage LPT rotors 48 of FIG. 1 are each configured as an axial flow turbine rotor; e.g., an axial inflow-axial outflow turbine rotor. Each of these LPT rotors 48 includes a plurality of turbine blades (e.g., turbine airfoils, turbine vanes, etc.) arranged circumferentially around and connected to at least (or only) one rotor disk or hub. The LPT rotors 48 are disposed in and arranged longitudinally along the core flowpath 32 between the HPT section 30A and the core exhaust 40. The turbine blades, for example, are disposed in and extend across the core flowpath 32. Each rotor disk or hub is disposed adjacent (e.g., radially below) the core flowpath 32. The present disclosure, however, is not limited to the foregoing exemplary LPT section arrangement. For example, while the LPT section 30B is shown in FIG. 1 with three stages, the LPT section 30B may alternatively include a single one of the stages, two of the stages or more than three stages. Moreover, while the LPT rotors 48 are shown as axial flow turbine rotors, any one or more of the LPT rotors 48 may alternatively be configured as a radial flow turbine rotor.

The LPC rotors 42 are coupled to and rotatable with the HPT rotor 46. The LPC rotors 42 of FIG. 1, for example, are connected to the HPT rotor 46 by an intermediate speed shaft 50. At least (or only) the LPC rotors 42, the HPT rotor 46 and the intermediate speed shaft 50 collectively form an intermediate speed rotating assembly 52; e.g., an intermediate speed spool. The LPT rotors 48 are connected to a low speed shaft 54. At least (or only) the LPT rotors 48 and the low speed shaft 54 collectively form a low speed rotating assembly 56. This low speed rotating assembly 56 is further coupled to the propulsor rotor 20 (e.g., the driven rotor 18) through a drivetrain 58. This drivetrain 58 may be configured as a geared drivetrain, where a geartrain 60 (e.g., a transmission, a speed change device, an epicyclic geartrain, etc.) is disposed between and operatively couples the propulsor rotor 20 to the low speed rotating assembly 56 and its LPT rotors 48. With this arrangement, the propulsor rotor 20 may rotate at a different (e.g., slower) rotational velocity than the low speed rotating assembly 56 and its LPT rotors 48. However, the drivetrain 58 may alternatively be configured as a direct drive drivetrain, where the geartrain 60 is omitted. With this arrangement, the propulsor rotor 20 rotates at a common (the same) rotational velocity as the low speed rotating assembly 56 and its LPT rotors 48. Referring again to FIG. 1, each of the rotating assemblies 52, 56 and its members 42, 46, 48, 50, 54 may be rotatable about the axis 22. The axis 22 may thereby be a rotational axis and/or a centerline axis of the rotating assemblies 52 and 56 and their members 42, 46, 48, 50 and 54.

Figure 2:
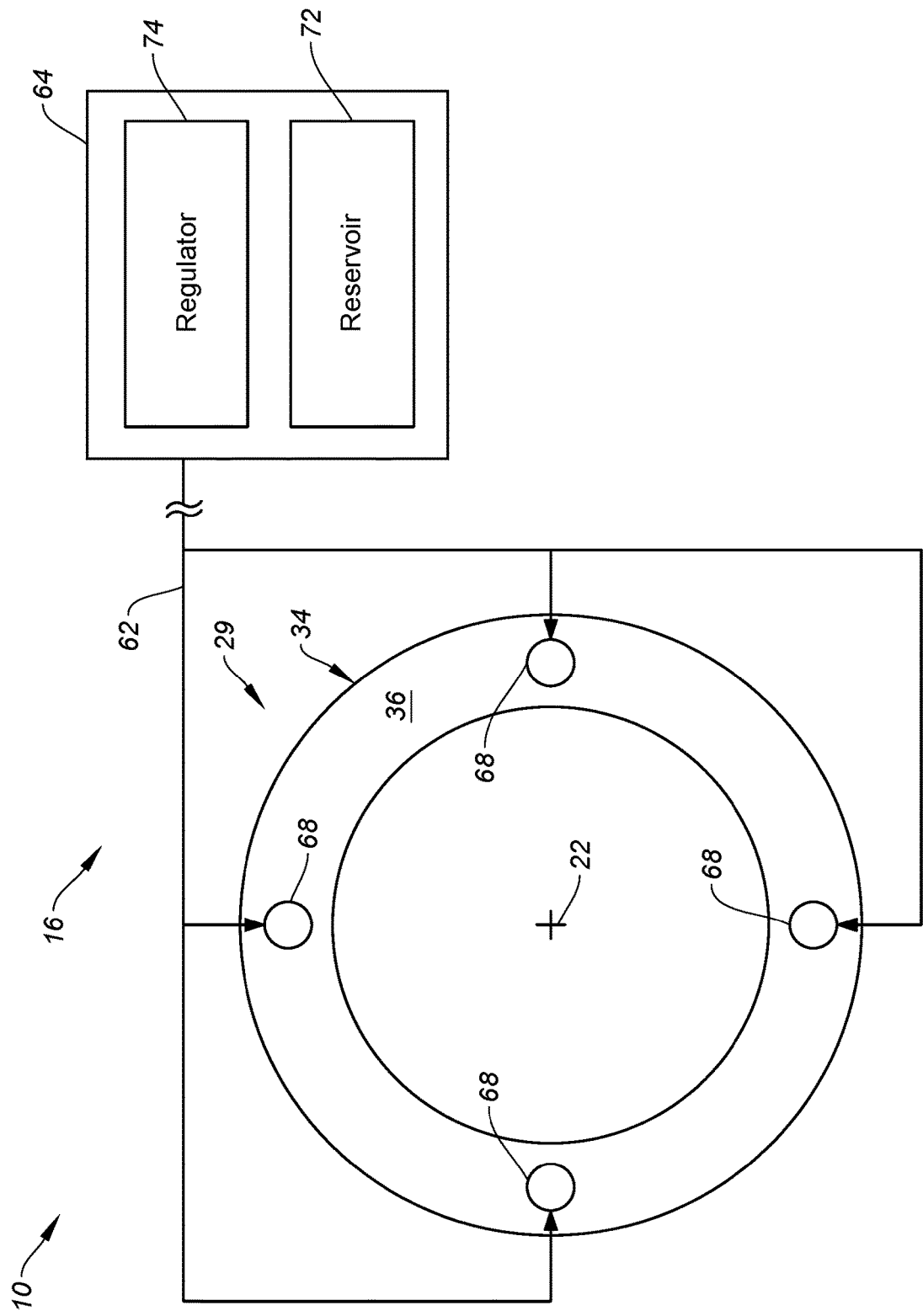
FIG. 2 is a partial schematic illustration of a fuel system arranged with a combustor section.

The fuel system 16 includes a fuel flowpath 62, a fuel source 64, a fuel driven turbine section 66 ("fuel turbine section") (e.g., a turbo-expander section) and one or more fuel injectors 68 (see also FIG. 2). The fuel system 16 of FIG. 1 also includes a heat exchanger 70. The fuel flowpath 62 is fluidly coupled with an outlet from the fuel source 64 and an inlet to each fuel injector 68. This fuel flowpath 62 extends from the fuel source 64 and its outlet, sequentially through the heat exchanger 70 and the fuel turbine section 66, to each fuel injector 68 and its inlet.

The fuel source 64 may include a fuel reservoir 72 and a fuel flow regulator 74. The fuel reservoir 72 is configured to store a quantity of fuel before, during and/or after engine system operation. The fuel reservoir 72, for example, may be configured as or otherwise include a tank, a cylinder, a pressure vessel, a bladder or any other type of fuel storage container. The fuel flow regulator 74 is configured to direct and/or meter a flow of the fuel from the fuel reservoir 72 to one or more or all of the fuel injectors 68 through the fuel flowpath 62. The fuel flow regulator 74, for example, may be configured as or otherwise include a fuel pump and/or a fuel valve (or valves).

The fuel turbine section 66 includes a bladed fuel driven turbine rotor 76 ("fuel turbine rotor", or "FT rotor"). The FT rotor 76 of FIG. 1 is configured as a radial flow turbine rotor; e.g., a radial inflow-axial outflow turbine rotor. The FT rotor 76 includes a plurality of turbine blades (e.g., turbine airfoils, turbine vanes, etc.) arranged circumferentially around and connected to at least (or only) one rotor disk or hub. The FT rotor 76 is disposed in and arranged longitudinally along the fuel flowpath 62 between (a) the fuel source 64 as well as the heat exchanger 70 and (b) the fuel injectors 68. The turbine blades, for example, are disposed in and extend across the fuel flowpath 62. The rotor disk or hub is disposed adjacent (e.g., radially below) the fuel flowpath 62. The present disclosure, however, is not limited to the foregoing exemplary fuel turbine section arrangement. For example, while the fuel turbine section 66 is shown in FIG. 1 with a single stage, the fuel turbine section 66 may alternatively include multiple stages. Moreover, while the FT rotor 76 is shown as a radial flow turbine rotor, the FT rotor 76 may alternatively be configured as an axial flow turbine rotor.

The fuel turbine section 66 and its FT rotor 76 may be integrated with the engine core assembly 14. The FT rotor 76 of FIG. 1, for example, is coupled to and rotatable with the HPC rotor 44. The FT rotor 76 of FIG. 1, in particular, is connected to the HPC rotor 44 by a high speed shaft 78. At least (or only) the HPC rotor 44, the FT rotor 76 and the high speed shaft 78 collectively form a high speed rotating assembly 80; e.g., a high speed spool. This high speed rotating assembly 80 may be rotatable about the axis 22. The axis 22 may thereby be a rotational axis and/or a centerline axis of the high speed rotating assembly 80 and its members 44, 76 and 78. The high speed rotating assembly 80 of FIG. 1 and its members 44, 76 and 78 are arranged axially between the LPC rotors 42 and the HPT rotor 46. With this arrangement, the intermediate speed shaft 50 and the low speed shaft 54 of FIG. 1 project axially through the high speed rotating assembly 80 and a bore of its high speed shaft 78.

The fuel turbine section 66 and its FT rotor 76 may be arranged radially inboard of the core combustor section 29 and its combustor 34. An inner radius of the combustor 34 of FIG. 1, for example, is sized greater than an outer radius of the FT rotor 76. At least an axially aft/fluidly downstream (with respect to the core flowpath 32) portion of the combustor 34 of FIG. 1 axially overlaps and circumscribes at least an axially forward/fluidly downstream (with respect to the fuel flowpath 62) portion of the FT rotor 76. Here, the combustor 34 is located axially between (a) an outlet 82 (along the core flowpath 32) from the HPC section 28B and, more generally, the core compressor section 28 and (b) an inlet 84 (along the fuel flowpath 62) into the fuel turbine section 66. To radially cross the core flowpath 32 to the fuel turbine section 66 and its inlet 84, the fuel flowpath 62 may extend through an internal passage of one or more stator vanes 86 (e.g., combustor exit guide vanes, turbine inlet guide vanes) in a vane array longitudinally between the combustor 34 and the HPT rotor 46.

Referring to FIG. 2, the fuel injectors 68 may be arranged circumferentially about the axis 22 in an array; e.g., a circular array. Each fuel injector 68 is configured to direct the fuel received from the fuel source 64 through the fuel flowpath 62 into the combustion chamber 36 for combustion.

Referring again to FIG. 1, the heat exchanger 70 may be configured as an intercooler for gas flowing within the core flowpath 32. The heat exchanger 70 of FIG. 1, for example, includes an internal fuel passage 88 and an internal core passage 90 which is fluidly discrete from the fuel passage 88. The fuel passage 88 forms a portion of the fuel flowpath 62 which extends longitudinally through the heat exchanger 70. The core passage 90 forms a portion of the core flowpath 32 which extends longitudinally through the heat exchanger 70. This portion of the core flowpath 32 formed by the core passage 90 of FIG. 1 is arranged between the compressor rotors 42 and 44. However, the heat exchanger 70 and its core passage 90 may alternatively be arranged upstream of one or more of the compressor rotors 42 or downstream of the compressor rotor 44 in other embodiments. The heat exchanger 70 of FIG. 1 is shown as a single pass, parallel flow heat exchanger. The heat exchanger 70 of the present disclosure, however, is not limited to such an exemplary arrangement. The heat exchanger 70, for example, may alternatively be configured as crossflow heat exchanger or a counterflow heat exchanger. Moreover, the fuel passage 88 and/or the core passage 90 may alternatively make two or more passes within the heat exchanger 70.

The fuel delivered by the fuel system 16 to the core combustor section 29 and its combustor 34 may be a non-hydrocarbon fuel; e.g., a hydrocarbon free fuel. The fuel system 16, for example, may direct hydrogen ($H_2$) fuel into the combustor 34 and into its combustion chamber 36. This hydrogen fuel may be stored within the fuel source 64 and its fuel reservoir 72 in a liquid phase. The fuel reservoir 72, in other words, may contain a quantity of the hydrogen fuel as liquid hydrogen ($H_2$). The hydrogen fuel, however, may be injected or otherwise introduced into the combustion chamber 36 by the fuel injectors 68 in a gaseous phase. The fuel injectors 68, in other words, may direct the hydrogen fuel into the combustion chamber 36 as gaseous hydrogen; e.g., hydrogen ($H_2$) gas.

During engine system operation, the fuel system 16 directs a flow of the hydrogen fuel (completely or substantially in its liquid phase) into the heat exchanger 70. The engine core assembly 14 also directs a flow of gas—compressed core air—into the heat exchanger 70 as described below in further detail. Here, a temperature of the compressed core air is (e.g., significantly) higher than a temperature of the hydrogen fuel. The heat exchanger 70 may thereby transfer heat energy from the compressed core air into the hydrogen fuel. This transfer of heat energy (heat transfer) from the compressed core air to the hydrogen fuel cools the compressed core air and heats the hydrogen fuel. The heating of the hydrogen fuel may facilitate a partial or complete phase change of the hydrogen fuel from the liquid phase to the gaseous phase. The hydrogen fuel (completely or substantially in its gaseous phase) is directed within the fuel flowpath 62 from the heat exchanger 70, through the stator vanes 86, to the fuel turbine section 66 for expansion across the FT rotor 76. As the hydrogen fuel passes through the stator vanes 86, the hydrogen fuel cools the stator vanes 86. The stator vanes 86 may also transfer additional heat energy into the hydrogen fuel from combustion products flowing through the core flowpath 32, thereby further heating the hydrogen fuel. Within the fuel turbine section 66, the expansion of the hydrogen fuel may drive rotation of the FT rotor 76 about the axis 22. The rotation of the FT rotor 76 may drive rotation of the HPC rotor 44 about the axis 22 and, thus, further compression of the now cooled compressed core air received from the heat exchanger 70. The fuel system 16 subsequently directs the expanded hydrogen fuel within the fuel flowpath 62 from the fuel turbine section 66 to the fuel injectors 68 for injection into the combustion chamber 36.

Concurrently during the engine system operation, air may enter the engine system 10 through an airflow inlet 92. This air is directed through a propulsor section 94, which includes the propulsor rotor 20, and into the core flowpath 32. The air entering the core flowpath 32 may be referred to as the core air. This core air is compressed by the LPC rotors 42 and directed into the heat exchanger 70. The heat exchanger 70 may cool the compressed core air as described above. This cooled compressed core air may be further compressed by the HPC rotor 44 before being diffused and directed into the combustor 34 and its combustion chamber 36. The hydrogen fuel supplied by the fuel injectors 68 and the compressed core air are mixed within the combustion chamber 36 to provide a fuel-air mixture. This fuel-air mixture is ignited and combustion products thereof flow through and sequentially cause the HPT rotor 46 and the LPT rotors 48 to rotate. The rotation of the HPT rotor 46 drives rotation of the LPC rotors 42 and, thus, compression of the air directed into the core flowpath 32. The rotation of the LPT rotors 48 drive rotation of the propulsor rotor 20. The rotation of the propulsor rotor 20 may propel additional air (e.g., bypass air, outside air, etc.) outside of and axially along the engine core assembly 14 to provide aircraft thrust. The propulsion of this additional air may account for a majority of the aircraft thrust generated by the engine system 10. Of course, where the driven rotor 18 is alternatively configured as the generator rotor, the rotation of the generator rotor may facilitate generation of electric power.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An engine system, comprising:
an engine core assembly including a core flowpath, a core compressor section, a core combustor section and a core turbine section, the core flowpath extending through the core compressor section, the core combustor section and the core turbine section from an inlet into the core flowpath to an exhaust from the core flowpath, the core compressor section comprising a first core compressor rotor and a second core compressor rotor, the core turbine section comprises a core turbine rotor coupled to and rotatable with the second core compressor rotor about an axis, and the core combustor section comprising a combustor; and
a fuel system including a fuel flowpath, a fuel turbine section and a fuel injector, the fuel flowpath extending through the fuel turbine section to the fuel injector, the fuel turbine section comprising a fuel turbine rotor coupled to and rotatable with the first core compressor rotor, and the fuel injector configured to direct fuel received from the fuel flowpath into the combustor;
wherein the first core compressor rotor and the fuel turbine rotor are disposed axially between the second core compressor rotor and the core turbine rotor along the axis.

2. The engine system of claim 1, wherein
the fuel system is configured to expand the fuel flowing within the fuel flowpath along the fuel turbine section to drive rotation of the fuel turbine rotor; and
the fuel turbine rotor is configured to drive rotation of the first core compressor rotor to compress gas flowing within the core flowpath along the core compressor section.

3. The engine system of claim 1, wherein
the fuel comprises hydrogen, and the fuel system further includes a fuel reservoir configured to contain a quantity of the hydrogen in a liquid phase; and
the fuel system is configured to direct the hydrogen into the combustor in a gaseous phase through the fuel injector.

4. The engine system of claim 1, wherein the first core compressor rotor and the fuel turbine rotor are rotatable about the axis.

5. The engine system of claim 4, wherein the combustor is disposed axially between an outlet from the core compressor section and an inlet into the fuel turbine section along the axis.

6. The engine system of claim 1, wherein the first core compressor rotor comprises a radial flow compressor rotor.

7. The engine system of claim 1, wherein the fuel turbine rotor comprises a radial flow turbine rotor.

8. The engine system of claim 1, wherein
the core compressor section includes a low pressure compressor section and a high pressure compressor section;
the low pressure compressor section comprises the second core compressor rotor; and
the high pressure compressor section comprises the first core compressor rotor.

9. The engine system of claim 1, wherein the second core compressor rotor comprises a radial flow compressor rotor.

10. The engine system of claim 9, wherein
the core compressor section further comprises an axial flow compressor rotor; and
the core turbine rotor is coupled to and rotatable with the axial flow compressor rotor.

11. The engine system of claim 1, wherein the core turbine rotor comprises an axial flow turbine rotor.

12. The engine system of claim 1, further comprising:
an intercooler configured to exchange heat energy between the fuel flowing within the fuel flowpath and gas flowing within the core flowpath;
the intercooler disposed along the core flowpath between the first core compressor rotor and the second core compressor rotor; and
the intercooler disposed along the fuel flowpath upstream of the fuel turbine rotor.

13. The engine system of claim 1, further comprising:
a propulsor rotor;
the core turbine motor coupled to and rotatable with the propulsor rotor.

14. The engine system of claim 1, further comprising:
an electric power generator comprising a generator rotor;
the core turbine motor coupled to and rotatable with the generator rotor.

* * * * *